Patented Nov. 7, 1950

2,529,282

UNITED STATES PATENT OFFICE 2,529,282

PHONOGRAPH RECORD

Irwin C. Clare, Wilmington, Del., assignor to Hercules Powder Company, Wilmington, Del., a corporation of Delaware No Drawing. Application October 9, 1946, Serial No. 702,095

8 Claims. (Cl. 260—14)

This invention relates to phonograph records and more particularly to phonograph records containing cellulose acetate and a petroleum hydrocarbon-insoluble pine wood resin.

Recognized desirable properties of plastic phonograph record material are good flow characteristics at molding temperatures, resistance to cold flow, high resistance to warping, toughness and resistance to shock, ready workability of scrap, wear resistance to action of the needle on the sound track, high fidelity of reproduction and freedom from record noise.

It is known in the art to produce phonograph records from cellulose acetate and more particularly to produce phonograph records from a combination of cellulose acetate and petroleum hydrocarbon-insoluble pine wood resins to provide records having many of the desirable properties outlined above. Such records of the well-known compositions have heretofore, however, not been satisfactorily wear resistant or free of needle noise and rapidly lost their high fidelity of reproduction. In the case of cellulose acetate-petroleum hydrocarbon-insoluble pine wood resin records the needle noise and low wear resistance appear to be due to lack of complete homogeneity between the cellulose acetate and the petroleum hydrocarbon-insoluble pine wood resin. Although the two are compatible at molding temperatures, especially in the presence of plasticizers, they apparently become incompatible at lower temperatures and the lack of homogeneity becomes apparent in the finished record especially in the rapid development of needle noise while in use. The increase in the amount of the usual plasticizers does not correct these disadvantages. In fact, adequate increase in plasticizer content tends to cause increased needle drag and distorted reproduction.

Now in accordance with this invention, it has been found that all of these disadvantages of the prior art records are overcome by molding the phonograph records from a thermoplastic binder composition comprising cellulose acetate, a plasticizer therefor, a petroleum hydrocarbon-insoluble pine wood resin, a phenol-aldehyde fluxing resin, and a high melting wax, and a mineral filler admixed therewith, all in the proportions hereinafter specified. Pigments and mold lubricants may be included in the record composition if desired.

The composition may be produced by melting all of the ingredients together in the proper proportions or by dissolving them in the presence of a volatile solvent which may subsequently be driven off. The composition is preferably produced by milling the cellulose acetate and plasticizer on a hot two-roll mill or in a Banbury Mixer to form a master mix and then incorporating the petroleum hydrocarbon-insoluble pine wood resin, phenol-aldehyde fluxing resin, high melting wax, and pigments and fillers to a portion of the master mix. The finished composition may be molded in the form of biscuits and the sound track may be impressed therein with a conventional record press.

Specific examples of phonograph records of this invention and characteristics thereof follow.

Example I

Five hundred fifty parts cellulose acetate having a substitution equivalent to 56% combined acetic acid was colloided in a Banbury Mill with 175 parts methyl phthalyl ethyl glycolate and 175 parts diethyl phthalate. To 90 parts of this plastic in the Banbury Mill was then gradually added a mixture of 140 parts petroleum hydrocarbon-insoluble pine wood resin, 716 parts mineral filler (whiting 75% and red slate flour 25%), 3 parts zinc stearate as a mold lubricant, 10 parts carbon black as a pigment, 7 parts microcrystalline wax (melting point 85°–90° C.), and 35 parts phenol-aldehyde resin (100% phenol-formaldehyde resin, melting point 155°–160° F., acid number 4–7). The mixing was carried out at 360° F. After thorough mixing, the composition was sheeted on a two-roll mill and formed into biscuits. Biscuits were then molded into phonograph records of $5/64$ inch thickness in a standard press having matrices of sound recordings. Test pieces cut from these records showed an angle of bend of 7° and a flexural modulus of 570,000 lb./sq. in. The records were highly wear resistant and free of needle noise and maintained their high fidelity of reproduction over long periods of use. They were distinctly superior in these respects to similar records without the phenol-aldehyde fluxing resin. Furthermore, the records had a high gloss which greatly improved their visual appearance. Moreover, the records were more flexible than similar records without the phenol-aldehyde fluxing resin or the wax.

Example II

Using the same procedure as in Example I a phonograph record composition was made from 61 parts cellulose acetate having 56% combined acetic acid content (35–55 sec. viscosity), 32 parts of a mixture of equal parts diethyl phthalate and methyl phthalyl ethyl glycolate, 140 parts petroleum hydrocarbon-insoluble pine wood resin, 3 parts zinc stearate, 9 parts microcrystalline hydrocarbon wax (melting point 85°–90° C.), 17 parts phenol-aldehyde resin (100% phenol-formaldehyde resin, melting point 155°–160° F., acid number 4–7), 728 parts mineral filler, and 10 parts carbon black. Phonograph records of 5/64 inch thickness were made from this composition. The records had excellent wearing qualities and a Rockwell hardness of 116 (R Scale). Phonograph records made from a similar composition without the wax or resin were much less flexible and had poor wearing qualities. The flexibility and wearing qualities were somewhat improved but without increasing the surface hardness simply by the addition of microcrystalline hydrocarbon wax melting in the range of 85 to 90° C. The inclusion of the fluxing resin gave the record a harder surface, reduced needle noise, improved the resistance to wear, and lengthened the life of its high fidelity of reproduction.

*Example III*

Using the same procedure as in Example I, a plastic binder composition for phonograph records was made from 40.7 parts petroleum hydrocarbon-insoluble pine wood resin, 25 parts cellulose acetate having 56% combined acetic acid plasticized with 7.5 parts diethyl phthalate and 7.5 parts methyl phthalyl ethyl glycolate, 4.2 parts carnauba wax, and 15 parts phenol-aldehyde resin (melting point 155°–160° F., acid number 4–7). To this binder composition were added whiting and red slate flour in the ratio of 3:1 in sufficient amount to make a composition containing 72% filler. Phonograph records pressed from the resulting composition had an excellent gloss, were highly wear resistant, were substantially free of needle noise, and maintained their high fidelity of reproduction over much longer periods than similar records without the phenol-aldehyde fluxing resin.

*Example IV*

Using the same procedure as in Example I a phonograph record composition was made from 55 parts cellulose acetate having 56% combined acetic acid content (35–55 sec. viscosity), 12 parts diethyl phthalate, 12 parts dimethyl phthalate, 12 parts methyl phthalyl ethyl glycolate, 140 parts petroleum hydrocarbon-insoluble pine wood resin, 3 parts zinc stearate, 9 parts carnauba wax, 716 parts mineral filler (whiting 75% and red slate flour 25%), 10 parts carbon black, and 35 parts phenol-aldehyde resin (100% phenol-formaldehyde resin, melting point 155°–160° F., acid number 15–20).

Records pressed from this composition had a high gloss, were highly wear resistant, were substantially free of needle noise, and maintained their high fidelity of reproduction over long periods of use.

Within the scope of this invention the various ingredients used may be varied within certain limits. Broadly, the cellulose acetate may be plasticized with about one-third to about three-fourths its weight of plasticizer. Preferably, the amount of plasticizer is within the range of about 40% to about 50% of the weight of the cellulose acetate. The petroleum hydrocarbon-insoluble pine wood resin may be used in an amount within the range of about one to three times the combined weight of the cellulose acetate and the cellulose acetate plasticizer. Preferably, the amount of petroleum hydrocarbon-insoluble pine wood resin is within the range of about 1.5 to about 2.5 times the weight of the plasticized cellulose acetate. The amount of phenol-aldehyde fluxing resin may be within the range of about 5% to about 20% of the weight of the thermoplastic binder composition. It has been found advantageous to base the weight of the phenol-aldehyde fluxing resin on the amount of petroleum hydrocarbon-insoluble pine wood resin used. The amount is thus suitably expressed as being between about 10% and about 45% of the weight of the petroleum hydrocarbon-insoluble pine wood resin. The preferred range of phenol-aldehyde fluxing resin is from about 10% to about 25% of the weight of said petroleum hydrocarbon-insoluble pine wood resin. The amount of wax may vary from about 1% to about 10% of the entire thermoplastic binder composition and is preferably 2–7.5% of said binder composition. The filler may be used in an amount within the range of about one to five times the weight of the thermoplastic binder composition and is preferably used in an amount within the range of about two to about three times the weight of said binder composition.

Cellulose acetate of a number of commercial grades may be used but those grades having a combined acetic acid content of from about 52% to about 58.5% and having a viscosity of from about 10 to about 250 seconds are preferred.

The plasticizers for the cellulose acetate may be any of the well-known cellulose acetate plasticizers such as dimethyl, diethyl, and dibutyl phthalate; methyl cellosolve phthalate; methyl phthalyl ethyl glycolate; ethyl toluene sulphonamid; acetyl triethyl citrate, triphenyl phosphate; ethyl p-toluene sulfonate; diphenyl tartrate; diethylene glycol dipropionate; etc., or mixtures thereof. Petroleum hydrocarbon-insoluble pine wood resin is compatible with all of these cellulose acetate plasticizers and it is believed preferable to use only plasticizers compatible with the petroleum hydrocarbon-insoluble pine wood resin.

The petroleum hydrocarbon-insoluble pine wood resin used in producing the phonograph records of this invention is the petroleum hydrocarbon-insoluble fraction prepared from pine wood, preferably from pine stump wood in the following manner.

The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum hydrocarbon, such as, for example, gasoline, dissolves and removes the rosin. After separation of the rosin, high in abietic acid, a resinous residue remains which is low in abietic acid. Alternatively, the residue of the initial coal tar hydrocarbon extract may be treated with a mixture of a petroleum hydrocarbon, as gasoline and furfural, and the two layers which form separated, in which case the petroleum hydrocarbon-insoluble pine wood resin is found dissolved in the furfural from which it may be obtained by evaporation of the furfural. Other methods of isolating the desired petroleum hydrocarbon-insoluble pine wood resin may be employed, if desired, such as with use of other solvents for extracting the total resin content from the wood. The resin may be defoamed by steaming or heattreated to remove volatile substances. This resinous material, used in the composition of the present invention, is characterized by a dark reddish brown color, cherry red in solution, and by substantial insolubility in petroleum hydrocarbons, but it will vary somewhat in its specific characteristics such as acid number, melting point, exact petroleum ether solubility, and content of naphtha and toluol-insoluble material, depending upon the details of the extraction processes utilized. This resin will meet or nearly meet the following specifications; namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. The term "petroleum hydrocarbon-insoluble pine wood resin" wherever used in the specification and claims refers to the resin produced in the above described manner which meets the above specifications.

The fillers which may be used in the phonograph record may be of any of those generally used by the art such as China clay and other smooth clays, finely ground slate flour, barytes, or precipitated barium sulfate, kieselguhr, silica powder, carbon black, marble flour, whiting, metal oxides such as titanium dioxide and zinc oxide. Cotton floc and ground up paper may also be used as fillers.

The fluxing resins which are used for improving the surface hardness, wear resistance, and reduction in needle noise of the phonograph records of this invention are resins which are compatible with both cellulose acetate and the petroleum hydrocarbon-insoluble pine wood resin and are suitably phenol-aldehyde resins. These resins may be resinous condensation products of phenols such as phenol, cresols, xylenols, and their ethers such as phenetole, anisole, etc., with aldehydes such as formaldehyde, acetaldehyde and furfural. The fluxing resins are preferably of the thermoplastic type of phenol-aldehyde resin and should have a drop melting point within the range of about 65° C. to about 175° C. and preferably within the range of about 65° C. to about 95° C.

The waxes used in these phonograph record compositions may be any of the hard waxes which impart a lubricating action such as carnauba, candelilla, and montan waxes and high melting paraffin and related hydrocarbon waxes such as microcrystalline wax derived from petroleum. A satisfactory microcrystalline wax is that melting at about 85–90° C. (Hercules Drop Melting Point Method). The preferred waxes melt in the range of about 70° C. to about 100° C.

The phonograph records of this invention as described above are distinct improvements over the phonograph records made from cellulose acetate and petroleum hydrocarbon-insoluble pine wood resin as already known to the art. The improvements thus indicated are shown by such physical characteristics as resistance to wear, freedom from needle noise, and their high fidelity of reproduction.

What I claim and desire to protect by Letters Patent is:

1. A phonograph record having a grooved reproducing surface comprising a homogeneous thermoplastic binder composition consisting of cellulose acetate having a combined acetic acid content within the range of about 52% to about 58%, a plasticizer therefor in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 175° C. in an amount within the range of about 10% to about 45% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic binder composition, and a filler admixed therewith in an amount within the range of about one to about five times the weight of said thermoplastic binder composition.

2. A phonograph record having a grooved reproducing surface comprising a homogenous thermoplastic binder composition consisting of cellulose acetate having a combined acetic acid content within the range of about 52% to about 58%, a plasticizer therefor in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 95° C. in an amount within the range of about 10% to about 45% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic binder composition, and a filler admixed therewith in an amount within the range of about one to about five times the weight of said thermoplastic binder composition.

3. A phonograph record having a grooved reproducing surface comprising a homogeneous thermoplastic binder composition consisting of cellulose acetate having a combined acetic acid content within the range of about 52% to about 58%, a plasticizer therefore in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 95° C. in an amount within the range of about 10% to about 25% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic binder composition, and a filler admixed therewith in an amount within the range of about one to about five times the weight of said thermoplastic binder composition.

4. A phonograph record having a grooved reproducing surface comprising a homogeneous thermoplastic binder composition consisting of cellulose acetate having a combined acetic acid content within the range of about 52% to about 58%, diethyl phthalate as a plasticizer therefor in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde resin having a drop melting point within the range of about 65° C. to about 95° C. in an amount within the range of about 10% to about 25% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic binder composition, and a filler admixed therewith in an amount within the range of about one to about five times the weight of said thermoplastic binder composition.

5. A phonograph record having a grooved reproducing surface comprising a homogeneous thermoplastic binder composition consisting of cellulose acetate having a combined acetic acid content within the range of about 52% to about 58%, triphenyl phosphate as a plasticizer therefor in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 95° C. in an amount within the range of about 10% to about 25% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic binder composition, and a filler admixed therewith in an amount within the range of about one to about five times the weight of said thermoplastic binder composition.

6. A phonograph record having a grooved reproducing surface comprising a homogeneous thermoplastic binder composition consisting of cellulose acetate having a combined acetic acid content within the range of about 52% to about 58%, methyl phthalyl ethyl glycolate as a plasticizer therefor in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 95° C. in an amount within the range of about 10% to about 25% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic binder composition, and a filler admixed therewith in an amount within the range of about one to about five times the weight of said thermoplastic binder composition.

7. A phonograph record having a grooved reproducing surface comprising a homogeneous thermoplastic binder composition consisting of cellulose acetate having a combined acetic acid content within the range of about 52% to about 58%, a mixture of diethyl phthalate and methyl phthalyl ethyl glycolate as a plasticizer therefor in an amount within the range of about one-third to about three-fourths the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 95° C. in an amount within the range of about 10% to about 25% of the weight of said petroleum hydrocarbon-insoluble aromatic hydrocarbon-soluble resinous pine wood extract, and a wax melting within the range of about 70° C. to about 100° C. in an amount within the range of about 1% to about 10% of the thermoplastic composition, and a filler in an amount within the range of about one to about five times the weight of said thermoplastic binder composition.

8. A phonograph record having a grooved reproducing surface comprising a homogeneous thermoplastic binder composition consisting of cellulose acetate having a combined acetic acid content within the range of about 52% to about 58%, a mixture of diethyl phthalate and methyl phthalyl ethyl glycolate as a plasticizer therefor in an amount within the range of about 40% to about 50% the weight of said cellulose acetate, a petroleum hydrocarbon-insoluble aromatic hydrocarbon-soluble resinous pine wood extract in an amount within the range of about one to about three times the combined weight of the cellulose acetate and said plasticizer, a thermoplastic phenol-aldehyde fluxing resin having a drop melting point within the range of about 65° C. to about 95° C. in an amount within the range of about 10% to about 25% of the weight of said petroleum hydrocarbon-insoluble aromatic hydrocarbon-soluble resinous pine wood extract, and carnauba wax in an amount within the range of about 2% to about 5% of the thermoplastic binder composition, and a filler admixed therewith in an amount within the range of about two to about three times the weight of said thermoplastic binder composition.

IRWIN C. CLARE.

REFERENCES CITED

The following references are of record in the file of this patent:

UNITED STATES PATENTS

| Number | Name | Date |
| --- | --- | --- |
| 1,720,192 | Weith et al. | July 9, 1929 |
| 1,963,251 | Schneider | June 19, 1934 |
| 2,022,383 | Moss | Nov. 26, 1935 |
| 2,050,366 | Moss | Aug. 11, 1936 |
| 2,114,393 | Lane | Apr. 10, 1938 |
| 2,130,239 | Hunter | Sept. 13, 1938 |
| 2,327,862 | Borglin | Aug. 24, 1943 |
| 2,359,972 | DeBell | Oct. 10, 1944 |
| 2,446,578 | Eddison | Aug. 10, 1948 |